US006085148A

United States Patent [19]

Jamison et al.

[11] Patent Number: 6,085,148

[45] Date of Patent: Jul. 4, 2000

[54] AUTOMATED TOURING INFORMATION SYSTEMS AND METHODS

[76] Inventors: Scott R. Jamison, 594 S. 500 East, Riverheights, Utah 84321; Derek R. DeVries, 2248 W. 200 South, Ogden, Utah 84404; Richard L. Jamison, 11401 Willow Hill Dr., Sandy, Utah 84092

[21] Appl. No.: 08/956,144

[22] Filed: Oct. 22, 1997

Related U.S. Application Data

[60] Provisional application No. 60/046,400, May 13, 1997.

[51] Int. Cl.[7] .......... G01C 21/00

[52] U.S. Cl. .......... 701/211; 701/207; 701/213; 701/214; 342/357.01; 342/450

[58] Field of Search .......... 701/211, 213, 701/214, 215, 300, 200, 207; 342/457, 458, 463, 357.01, 357.06, 357.08, 357.13; 340/980; 235/384

[56] References Cited

U.S. PATENT DOCUMENTS

| | | | |
|---|---|---|---|
| 5,223,844 | 6/1993 | Mansell et al. | 342/357.07 |
| 5,471,392 | 11/1995 | Yamashita | 364/443 |
| 5,485,163 | 1/1996 | Singer et al. | 342/457 |
| 5,524,081 | 6/1996 | Paul | 364/460 |
| 5,552,989 | 9/1996 | Bertrand | 364/443 |
| 5,652,570 | 7/1997 | Lepkofter | 342/357.01 |
| 5,864,125 | 1/1999 | Szabo | 235/384 |
| 5,880,958 | 3/1999 | Helms et al. | 701/200 |

OTHER PUBLICATIONS

IBM Technical Disclosure Bulletin, "Methodology to Prevent Video and Software Piracy", vol. 36, No. 10 Oct. 1993.

IBM Technical Disclosure Bulletin "Mobile Visualization of Remote Sensor Data", vol. 37, No. 08 Aug. 1994.

*Primary Examiner*—William A. Cuchlinski, Jr.
*Assistant Examiner*—Yonel Beaulieu
*Attorney, Agent, or Firm*—Madson & Metcalf

[57] ABSTRACT

An apparatus for automatically disseminating information corresponding to a location includes a location identification device for providing a current location, a presentation device for presenting the information to a user, a controller operably connected to control the presentation device, and a storage device operably connected to the controller for storing the information and predefined location data linking the location to the information. In one embodiment, the controller may includes a processor programmed to receive the current location from the location identification device and compare the current location with the predefined location data. The apparatus may further include a memory device containing data structures including the current location data corresponding to a current location, the predefined location data, a comparison module for reading the current location data and comparing the current location data with the predefined location data, and a presentation module for controlling the output of the information to the presentation device from the storage device.

23 Claims, 5 Drawing Sheets

AUTOMATED TOURING INFORMATION SYSTEMS AND METHODS

BACKGROUND

1. Related Applications

This application claims the benefit of U.S. Provisional Patent Application Ser. No. 60/046,400, filed May 13, 1997, for AUTOMATED TOURING INFORMATION SYSTEMS AND METHODS.

2. The Field of the Invention

The present invention relates to the dissemination of information and, more particularly, to novel automated touring information systems and methods for automatically disseminating information about specific locations.

3. The Background Art

More and more people are traveling today. The world is growing vastly smaller because of the many modes of transportation available. Travelers enjoy using many forms of transportation. They are visiting national parks, historic places, museums, and the like, in record numbers. Currently, there are several different ways that travelers may receive information regarding each site that they visit. However, as will be pointed out, current methods of providing information to travelers have several disadvantages.

Some travelers simply rely on their own knowledge to determine what locations are of significance. In these scenarios, many important sites may be missed. As an example, many people who travel long distances often experience boredom because they are oblivious to locations of geologic significance or historical interest, or they are unable to pinpoint related information on maps or in resource books. As a result, they often do not stop at interesting historical landmarks, and they miss significant information about the areas they pass through.

Some touring companies have put together predefined tours so that those taking the tour do not have to be aware of the important sites because the touring company will identify most of the important sites. Some of these tours may use busses, while others may use other types of travel. Those who travel with a bus tour stop at only those places predefined by the touring company. Furthermore, these scheduled tours generally follow a time schedule made by the touring company. Because the tours are set for predefined places and predefined times, they are rather inflexible relative to a particular traveler's needs. In addition, those who travel by aircraft have the added problem of being re-routed to avoid storms or other flight-related delays. This re-routing usually disorients passengers so they do not know what landmark, or even which state, they are flying above.

Many museums give walking tours to visitors. People visiting museums or other large venues are usually required to follow a predefined path through exhibits on display at a predefined pace. However, most people's time is limited, and they would like to see particular types of displays at their own pace rather than follow a set presentation of all exhibits. Other people are simply adverse to large crowds and do not enjoy wandering in groups from exhibit to exhibit listening to a curator or tour guide.

To help solve some of the problems discussed above, others have developed devices or compiled books to help the traveler and information-seeker. One example of these devices is a road map (Rand McNally). But many of the current road maps do not point out or define historical landmarks or geological information. As travelers use road maps, many important or interesting features are missed and routes of scenic or historical significance are bypassed. Similarly, when travelers use a travel book or highway travel guide (i.e., National Geographic's "Historical Places of the U.S." or Reader's Digest's "See the USA The Easy Way") the tourist is required to be at least somewhat familiar with the area they are traveling through. Additionally, many of these books or guides rely on highway mileage markers to indicate the area of interest found in their pages. This can cause problems: if the traveler is driving alone while simultaneously trying to follow the guide, he or she runs the risk of having an accident while watching for the next mileage marker or site and reading the relative information in the book.

Another common touring device is the basic audio tape or CD player as used by "Acoustiguide" and "Tour Guide". Both use audio devices that are listened to, but still require the user to interact with the device while driving. One disadvantage of these devices includes the user's ability to access the proper tape locations for specific mileage markers or sites. Another problem is the limitation of having a predefined route. The CD player helps alleviate some of this concern by having travelers select the track number that corresponds to the map's mileage marker or travel book site location, but the problem still arises when the person operating the CD player must look to printed source material for the proper site, mileage marker or location to activate the device.

A tape player and digital device, such as "Acoustiguide" or "Inform", are already used in many museums and attractions, but the main drawback of these types of devices is that visitors must follow a preset path through the displays. This causes bottlenecks around the most popular exhibits. Although these audio devices allow the user to fast forward and rewind the tape, trying to find the correct location on the tape can be tiresome and frustrating. Finding the correct location on the tape may be especially frustrating if you are touring the exhibit or site with a group, friends, or family members, and even more so for foreign visitors who have difficulty understanding the English language. Another disadvantage of the tape player is its limitation in allowing visitors to attend only preferred exhibits or sites. The digital device can solve some of these problems by allowing users to move to sites of choice, but the user must still know what track to play when he or she arrives at the specific exhibit or site.

Another common device used at museums, exhibits and attractions is a kiosk. This device is usually a multimedia computer that has been pre-programmed with information about displays or sites that can be seen in the area. Although this device will display information on command, it is only placed in the locations where the most users can view its contents. A significant drawback of the kiosk is that usually only one person at a time can operate it, thus creating an information bottleneck. If several kiosks are installed to allow more people access to the information, the cost is very prohibitive. Another drawback of the kiosk is that the kiosk usually requires special equipment to be brought to the particular kiosk to update or change the information contained therein. Therefore, the information to be disseminated is not easily changed.

Another method of dispensing information is the (human) tour guide. The use of a tour guide can be preferable in some ways by adding a personal touch to the information conveyed. But this can also become a disadvantage if the person taking the tour only wants to see certain sites, or when the information presented varies according to the tour guide's persuasion or visitor response. Many tour busses have drivers that also act as tour guides for economical reasons. But this can be dangerous in some situations as it distracts the driver's attention from driving safely. Scenic aircraft pilots also, when occasion permits, are expected to describe large landmarks below that can be seen from one side of the plane or the other. Fatal plane crashes have resulted from a pilot's distraction from the main job of flying the plane.

As illustrated by the number of methods and devices relating to disseminating information related to specific locations, efforts are continuously being made in an attempt to develop devices capable of dispensing information relating to specific locations that overcome the many disadvantages of the foregoing devices and methods. In this regard, the present invention provides for novel automated touring information systems and methods that overcome several deficiencies of the foregoing systems and methods.

BRIEF SUMMARY AND OBJECTS OF THE INVENTION

In view of the foregoing, it is a primary object of the present invention to provide novel automated touring information systems and methods that automatically disseminate various forms of information to those who travel.

It is also an object of the present invention to relieve users of having to rely on their own knowledge to identify significant sites.

Further, it is an object to allow travelers a flexible schedule in touring points of interest whereby they are not bound by preset routes and time schedules.

Another object of this invention is to free a user from inconvenient monitoring, reading, and navigating of touring devices and/or information while touring sites of interest.

It is still a further object of the present invention to provide a user the flexibility of touring sites of interest at an arbitrary pace and by an arbitrary route without creating information bottlenecks.

Consistent with the foregoing objects, and in accordance with the invention as embodied and broadly described herein, an apparatus for automatically disseminating information corresponding to a location comprises a location identification device for providing a current location, a presentation device for presenting the information to a user, a controller operably connected to control the presentation device, and a storage device operably connected to the controller for storing the information and predefined location data linking the location to the information. In one embodiment, the controller may comprise a processor programmed to receive the current location from the location identification device and compare the current location with the predefined location data. The apparatus may further include a memory device containing data structures comprising the current location data corresponding to a current location, the predefined location data, a comparison module for reading the current location data and comparing the current location data with the predefined location data, and a presentation module for controlling the output of the information to the presentation device from the storage device.

In operation, the information and predefined location data are stored in the storage device before the apparatus for automatically disseminating information is used. In use, the processor receives the current location from the location identification device and compares the current location with the predefined location data to provide a proximity comparison. The proximity comparison reflects whether the apparatus is located proximate the site or location of significance. When the proximity comparison reflects that the apparatus is proximate, the controller initiates the output of the information from the storage device to the presentation device.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 5, is not intended to limit the scope of the invention, as claimed, but is merely representative of the presently preferred embodiments of the invention.

The presently preferred embodiments of the invention will be best understood by reference to the drawings, wherein like parts are designated by like numerals throughout.

Figure 1:
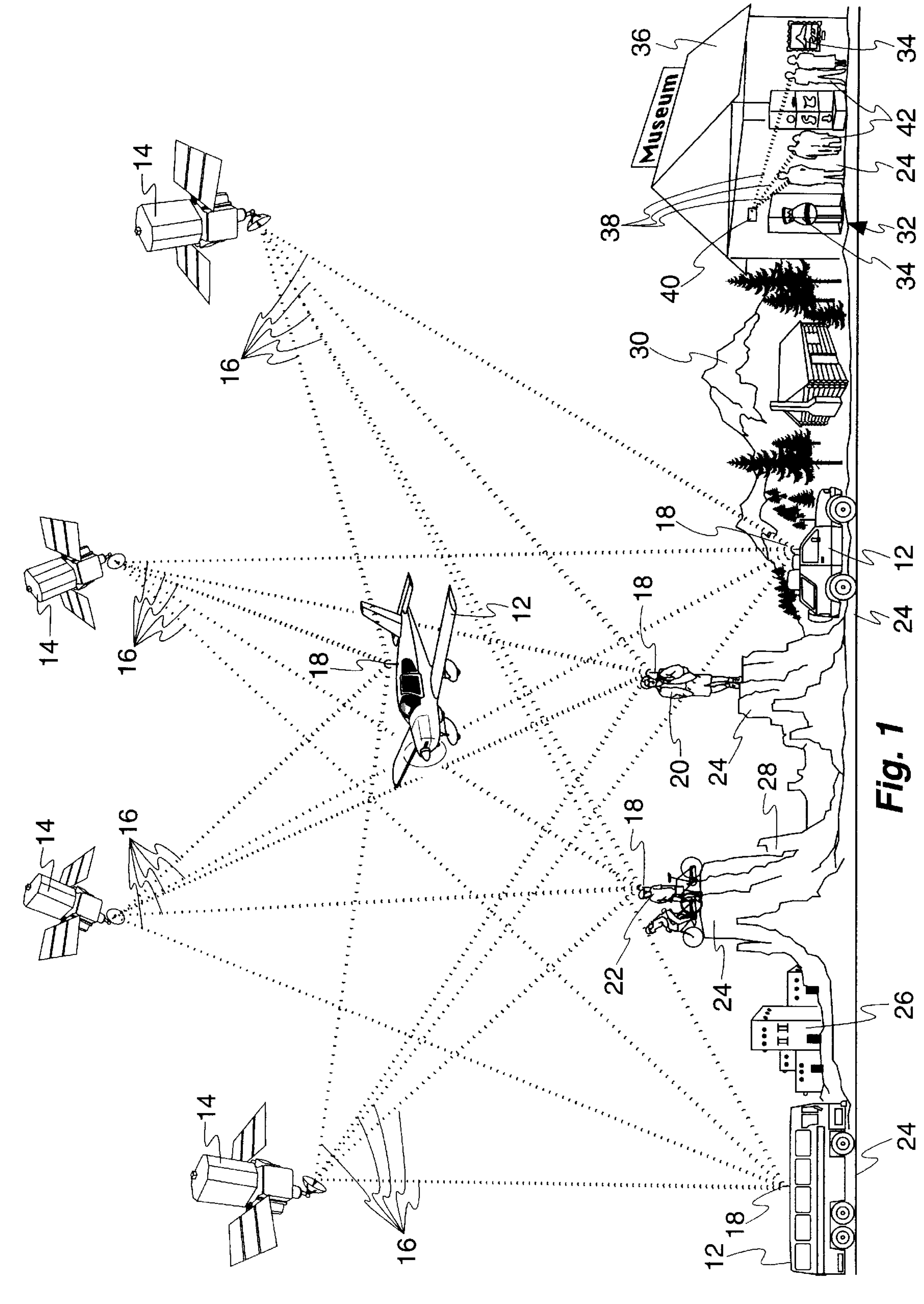
FIG. 1 is an overall view of the presently preferred contexts, applications, and uses of the present invention including illustrations of several different types of vehicles with which the present invention may be used.

As shown in FIG. 1, the present invention may be used in a variety of contexts and applications. Furthermore, FIG. 1 illustrates that several different types of vehicles 12 may be used with the present invention. As shown, vehicles 12 such as cars, busses, airplanes, and the like may be used in combination with the present invention.

In one presently preferred embodiment, the present invention may be used with a global positioning system to identify a current location. Four or more global positioning system (GPS) satellites 14, or global positioning stations 14, from a constellation of twenty-four are required for full three-dimensional location identification. Each satellite 14 broadcasts a low-power radio-frequency signal 16, or a global positioning signal 16, to the earth which is picked up by a GPS receiver and antenna 18 located on each of the vehicles 12 using the GPS option of the invention.

Typically, GPS receivers, using the signals 16, calculate the receivers longitude, latitude, altitude, and velocity and output this data through a built-in input/output device (not shown). GPS receivers are built by various companies such as Trimble, Magellan, Rockwell, etc.

As the GPS receiver is moved from one location to another, it determines the receiver's current longitude and latitude from three or more of the satellites 14 that are currently orbiting the earth. There is a limit to the accuracy of a GPS receiver and the locations where it can be used. For example, a GPS receiver needs line-of-sight to the orbiting satellites 14 and cannot be used indoors because of weak satellite signals 16. For this reason, the GPS receiver can only be used in locations, or with modes of transportation, where the accuracy of the receiver does not adversely affect the presentation of information to a user. At the present time, the military, who owns the satellites 14, issues a random error into the satellite signal 16. To overcome this problem, differential GPS has been invented and added to most commercial GPS receivers. The government has said that it plans to "turn off" this random error at some future time (reportedly by the year 2000). Both of these solutions will greatly improve the accuracy of all GPS receivers, allowing location identifying devices to be used at many more sites and locations. The GPS option of this invention may be located on all forms of transportation where practical. For example, FIG. 1 illustrates several different types of vehicles 12 which may be used with the present invention including busses, airplanes, and cars. In addition, the present invention may be carried by a person 20 traveling on foot, by persons 22 using bicycles for travel, and the like.

The present invention may be used at many different types of locations 24 for disseminating information corresponding to the location 24. Examples of types of locations 24 include historical sites 26, geological formations 28, scenic landscapes 30, and information centers 32 (e.g., a museum) including exhibits 34.

A user of the GPS option of the invention could also leave one form of transportation and enter a building 36 where GPS signals 16 cannot be received. In one presently preferred embodiment, the present invention may then be switched to a locally broadcast signal receiver (not shown in FIG. 1) for receiving a locally broadcast signal 38 transmitted by a local broadcast transmitter 40. Alternatively, users 42 in the information center 32 may be provided with a separate unit (not shown) that operates in accordance with the present invention using a locally broadcast signal 38.

Figure 2:
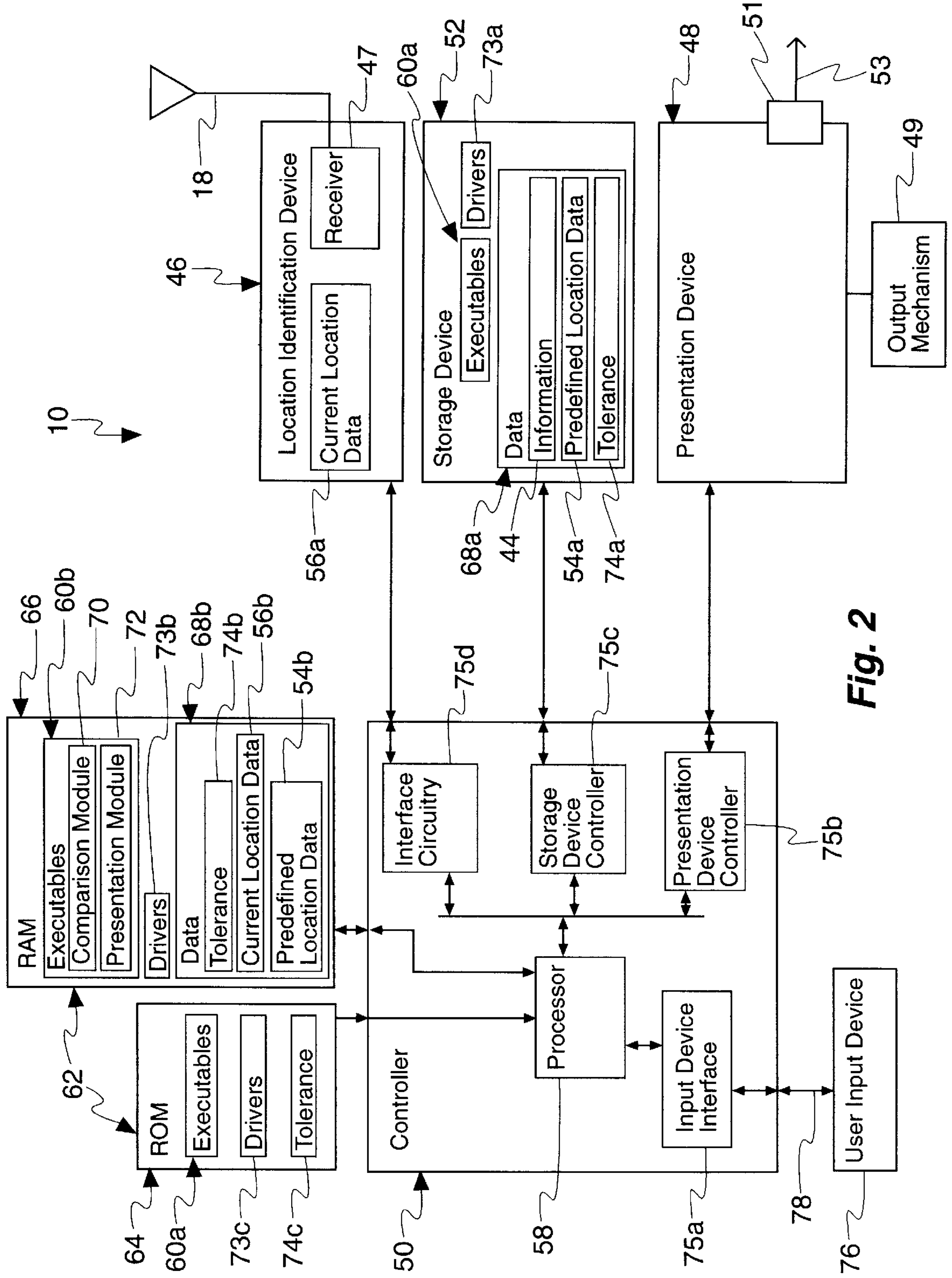
FIG. 2 is a block diagram of one presently preferred embodiment of the present invention comprising a controller, a user input device, memory, a location identification device, a storage device, and a presentation device.

Referring now to FIG. 2, the apparatus 10 for automatically selecting and presenting, proximate a location 24, information 44 corresponding to the location 24, comprises a location identification device 46, a presentation device 48 for presenting the information 44 to a user, a controller 50 operably connected to control the presentation device 48, and a storage device 52 operably connected to the controller 50 for storing the information 44 and predefined location data 54 linking the location 24 to the information 44.

The location identification device 46 provides current location data 56 identifying to the apparatus 10 a current location of the apparatus 10. This device 46 repeatedly provides its location to the controller 50. The location identification device 46 includes an antenna 18 for receiving signals 16, 38 from which the location 24 of the device 46 may be derived. The size and configuration of the antenna 18 may vary depending on the types of signals being received.

The location identification device 46 may include a receiver 47 for receiving a signal from which current location data **56*a* is calculated or obtained. The receiver 47 may be operably connected to the antenna 18 for receiving signals 16, 38. The receiver 47 may be of many types; typical receiver examples include GPS, Micron's "MicroStamp," local broadcast, or video recognition devices. Additionally, the receiver 47 may be an image recognition device, a motion sensor, a bar code reader, or any combination of methods that fit the user's requirements. As discussed in relation to FIG. 1, the receiver 47 may be a GPS receiver capable of receiving a plurality of GPS signals 16 broadcast from a plurality of global positioning stations 14**.

The current location data **56*a* may be formatted in a variety of ways, as will be appreciated by one skilled in the art. If a GPS receiver is used, the current location data 56*a* may be in the form of longitude and latitude values. Alternatively, different locations 24 that have corresponding information on the storage device 52, may simply be assigned different codes. This method of using codes for each location 24 may be especially useful for locally broadcast signals 38. A local broadcast transmitter 40 may transmit a local broadcast signal 38 corresponding to the location 24. The local signal 38 may correspond to a location 24 by carrying a code for that location 24**. When the local broadcast receiver receives this code, the receiver may use this code to find the appropriate piece of information to convey to the user.

The present invention 10 includes a presentation device 48 for presenting the information 44 to a user. The presentation device 48 built into this system 10 allows users to view or hear preconfigured data 44, the information 44, stored on the storage device 52. The information 44 may be of many different formats including audio, video, text (character code), moving maps, or multimedia. The information may be in the form of analog data or digital data. Examples of presentation devices 48 include stereo systems, video players, LCD screens, or any other suitable presentation system or device.

The presentation device 48 may include an output mechanism 49, such as an audio speaker, a visual display, a multimedia output device, and the like. However, the presentation device 48 may also be adapted for use with an external output mechanism. For example, the presentation device 48 may be adapted to feed an output signal 53 through a line out port 51 to a stereo system of a vehicle. In this embodiment of the present invention 10, the speakers would not be part of the apparatus 10. The presentation device 48, in this embodiment, may include an output line jack 51 to be operably connected to the vehicle's stereo system. Accordingly, within the present invention 10, the presentation device 48 includes embodiments that have components 49 for direct presentation to a user such as speakers, displays and the like. Additionally, the presentation device 48 includes embodiments having output connections 53 to enable operable connections to external components, like a vehicle's stereo system, an external display, and the like. Thus, the presentation device 48 may present information 44 to a user directly (e.g., the presentation device 48 includes a speaker, display, etc.), or the presentation device 48 may present the information 44 to a user indirectly (e.g., the presentation device 48 includes a line or lines out 51 for operable connection to one or more external components).

The controller 50 is operably connected to control the presentation device 48. In one presently preferred embodiment, the controller 50 comprises a processor 58 programmed to receive the current location data 56 from the location identification device 46 and compare the current location data 56 with the predefined location data 54. The processor 58 may also be programmed to control output of the information 44 from the storage device 52 to the presentation device 48.

The processor 58 may be a conventional microprocessor that will operate according to executable programs 60. The program 60 or programs 60 may be stored in memory 62. The memory devices 62 may include read-only memory 64 (ROM) and random-access memory 66 (RAM). In one presently preferred embodiment, the executables 60*a* may be stored in ROM 64 and may use data that is transferred into RAM 66 from the location identification device 46 and storage device 52. The processor 58 may run the executables 60*a* out of ROM 64. Alternatively, the processor 58 may transfer the executables 60*a* into RAM 66 and thereafter run the executables 60*b* out of RAM 66.

The executables 60 may include a comparison module 70 and a presentation module 72. The comparison module 70 may be used for reading or receiving the current location data 56*a* from the location identification device 46 and comparing the current location data 56*a* with the predefined location data 54*a*. The comparison module 70 may also store a copy 56*b* of the current location data 56*a* in RAM 66. Similarly, a copy 54*b* of the predefined location data 54*a* may also be stored in RAM 66.

In comparing the current location data 56 with the predefined location data 54, the comparison module 70 may provide a proximity comparison that reflects whether the apparatus 10 located at the current location is proximate the location. Before the comparison module 70 provides a proximity comparison, the module 70 may access a tolerance 74. The tolerance 74 may either be stored on the storage device 52 as tolerance 74*a*, in RAM 66 as tolerance 74*b*, or in ROM 64 as tolerance 74*c*. In one presently preferred embodiment, the storage device 52 stores the tolerance 74*a* and the comparison module 70 copies the tolerance 74*a* to RAM 66 as tolerance 74*b*.

The tolerance 74 may correspond to a maximum distance from the location, within which maximum distance the present invention 10 is determined to be proximate. Thus, when the apparatus is within a triggering distance of the location, the controller 50 may activate the presentation device 48 to present the information 44 to a user. The tolerance 74 is defined by the maximum or triggering distance.

The storage device 52 is operably connected to the controller 50 for storing data 68*a* including the information 44 and predefined location data 54*a* linking the location 24 to the information 44. Furthermore, the storage device 52 may store the executables 60*a* to be run by the processor 58. The storage device 52 may be used to store predefined areas or routes for use by the controller 50 in determining when to present certain information 44 to a user. The predefined location data 54*a* may include data defining predefined areas or routes. The predefined location data 54*a* may be stored in any suitable format capable of being compared with the format of the current location data 56. For example, the predefined location data 54*a* may be longitude and latitude, Cartesian coordinates, polar coordinates, predefined codes matched with certain sites, and the like.

The information 44 may be linked to a location by the predefined location data 54. In one embodiment, the information 44 may include a plurality of storage volumes, with each volume containing a plurality of information segments, with each information segment corresponding to a location. For example, if the storage device 52 comprised several CD-ROM drives, each CD-ROM may be referred to as a storage volume, and each track may be referred to as an information segment. In one presently preferred embodiment, the predefined location data 54 may include an identifier comprising a volume number and a track number thereby linking the information 44 to the predefined location data 54. In an alternative embodiment, the information 44 may comprise a plurality of files stored on a hard drive, and the predefined location data 54 may simply include an identifier giving the path and file name of the information linked to that predefined location.

As will be appreciated by one skilled in the art, the storage device 52 may store other components and/or data, as needed. For example, the storage device 52 may store device drivers 73*a*for operation of certain peripherals operably connected to the controller 50. These drivers 73*a* may be copied from the storage device 52 to RAM 73*b*. In some embodiments, drivers 73*c* may be stored in ROM 64 and loaded to RAM 66 when they 73 are needed.

The storage device 52 may be a single storage medium, such as one CD-ROM or one floppy disk drive. Alternatively, the storage device 52 may be several different types of storage. For example, the storage device 52 may include a floppy-disk drive and a CD-ROM drive. In one embodiment, the floppy-disk drive may contain the predefined location data 54*a* and the tolerance 74*a*, and the CD-ROM may contain the information 44, the executables 60*a*, and other sets of data needed by the present invention 10. It will be appreciated by one skilled in the art that a wide variety of different configurations may be used to configure and achieve the storage device 52. Several types of storage may be used in combination with the storage device 52 including a linear electromagnetic medium (e.g., a magnetic card), a rotating electromagnetic medium (e.g., a magnetic disk, such as a hard drive), a rotating laser-readable medium (e.g., a CD-ROM), and a solid-state memory device (e.g., ROM, RAM).

The present invention 10 may also include a user input device 76 operably connected to the controller 50 for receiving user inputs 78 to control selection of portions of the information 44 for presentation on the presentation device 48. Through the user input device 76, a user may select, start, stop, pause, and repeat the presentation of portions of the information 44. This option allows user intervention of the otherwise automated presentation. The controller 50 may comprise a processor 58 programmed to process the user inputs 78 to control the presentation device 48. The user input device 76 may include several different types of input devices, as will be discussed in relation to FIG. 4.

One skilled in the art will appreciate that additional support circuitry 75 may be required to interface with the various components described. An input device interface 75*a* may be needed. For example, in one embodiment the user input device 76 may be in the form of a keyboard and the input device interface 75*a* may be a keyboard interface, as known in the art. A presentation device controller 75*b* may be needed to interface with the presentation device 48. For example, in one embodiment the presentation device 48 may be a display and the controller 75*b* may be a video adapter circuit, as known in the art. If the storage device 52 were a CD-ROM drive, a storage device controller 75*c* comprising a CD-ROM controller may be included as part of the system 10. Interface circuitry 75*d* may also be necessary to interface with the location identification device 46.

Figure 3:
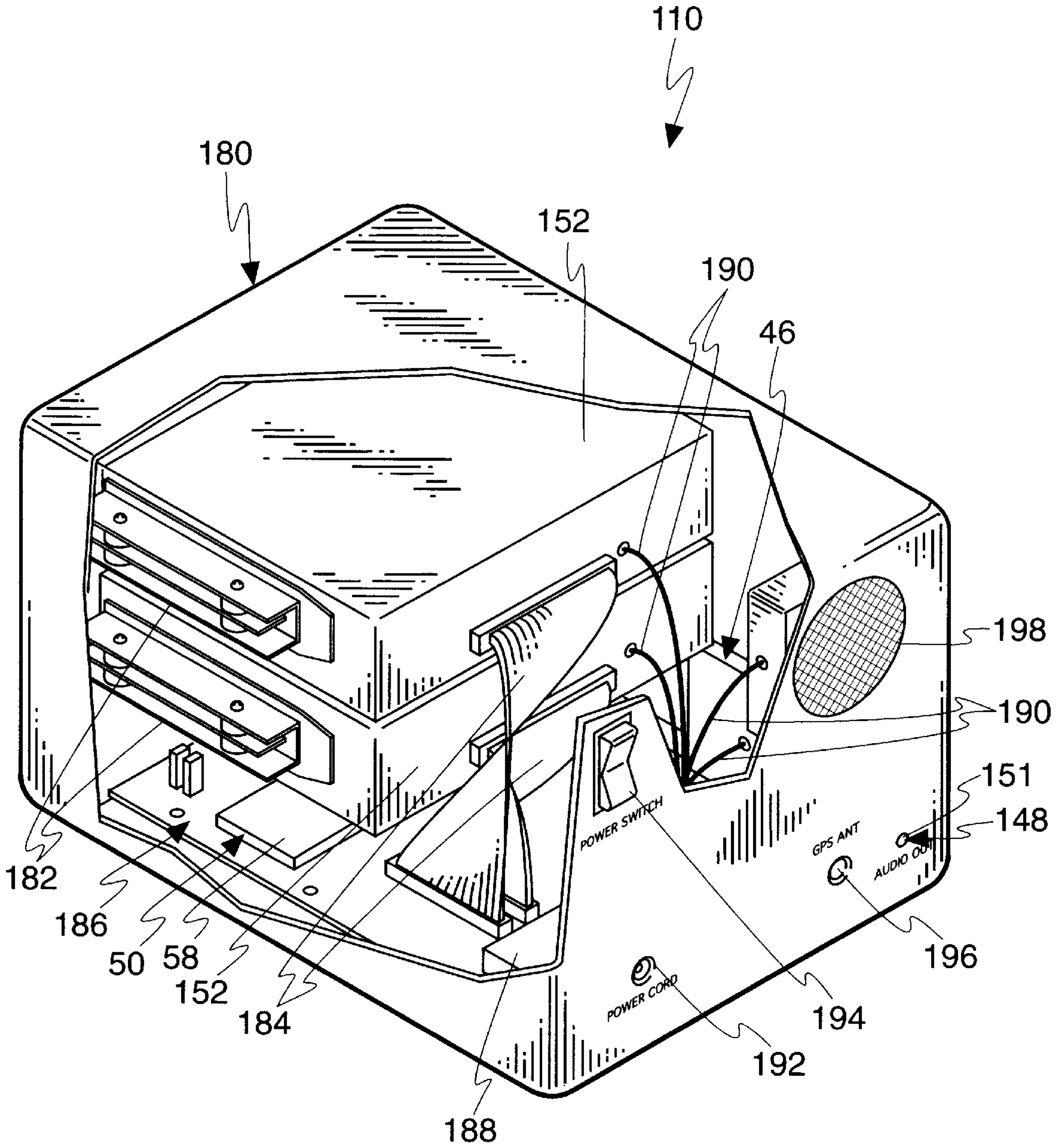
FIG. 3 is a rear perspective cut-away view of one presently preferred embodiment of the present invention in a form that may be used for extensive travel applications.

FIG. 3 illustrates one presently preferred embodiment of an apparatus 110 made in accordance with the principles of the present invention. This unit 110 may be particularly suited for use in many forms of transportation where the device 110 remains in the vehicle 12. In this embodiment, two CD-ROM drives 152 are used as the storage device 52 for providing input to the controller 50 and output through the presentation device 148. The apparatus 110 may be substantially enclosed in a case 180. The case 180 may be made out of plastic, metal, or any other similarly suitable material.

The CD-ROM drives 152 may be mounted on suspension rails 182. The suspension rails 182 may substantially reduce shock and vibration to the CD-ROM drives 152. The CD-ROMs 152 communicate through ribbon cables 184 that are connected to a multi-function computer board 186. The computer board 186 may include the various components comprising the controller 50. Accordingly, the processor 58 may be mounted to the computer board 186.

A power supply 188 is included to provide power to the apparatus 110 for automatically selecting and presenting, when proximate to a location, information corresponding to the location. In one presently preferred embodiment, the power supply 188 may be a DC-DC power supply enclosed inside the case 180 for use with vehicle power outputs (not shown) Power supply lines 190 from the various components may be connected to the power supply 188 for supplying power to the components.

The apparatus 110 of FIG. 3 uses the presentation system of the vehicle 12 to present information to a user. Typically, the presentation system of the vehicle 12 includes audio speakers operably connected to a radio, tape player, CD player, or the like. To enable the apparatus 110 to present the information 44 over the presentation system of the vehicle 12, the presentation device 148 may comprise at least one audio output 151 from the CD-ROMs 152 to operably connect to the vehicle's 12 existing presentation system. Presently there are methods developed by those skilled in the art to connect a portable CD player output to a tape player installed in a vehicle. This method is an exemplary illustration of how the operable connection between the presentation device 148 of an apparatus 110 like that of FIG. 3 and the presentation system of the vehicle 12 may be made. Alternatively, a user may also provide a portable presentation system, such as portable speakers, headphones, etc., for connecting to the presentation device 148.

External power may be provided to the system 110 through an external power cord (not shown) connected to the power connector 192. Those skilled in the art will appreciate the various ways of connecting power to the apparatus 110. For example, the power connector 192 and power cord (not shown) may be adapted to connect directly to the lighter plug found in many vehicles 12 today. Alternatively, the system 110 may be adapted to use a battery for power, as will be shown in relation to FIG. 4. The system 110 is turned on with an external power switch 194 positioned on the case 180 of the unit 110.

The antenna 18 of the unit 110 may be attached to the exterior of the vehicle 12. Accordingly, the unit 110 may include an antenna connector 196 for connecting the antenna 18 to the location identification device 46. Alternatively, and dependent on the type of receiver 47 being used, the system 110 may utilize the antenna 18 of the vehicle for receiving signals.

A fan 198 may be included within the case 180 for keeping electrical components within specified operating temperatures. Depending upon the configuration of the components inside the case 180, and depending upon the operating temperature of the differing components, the fan 198 may be placed in a variety of locations in, on, or about the case 180.

Figure 4:
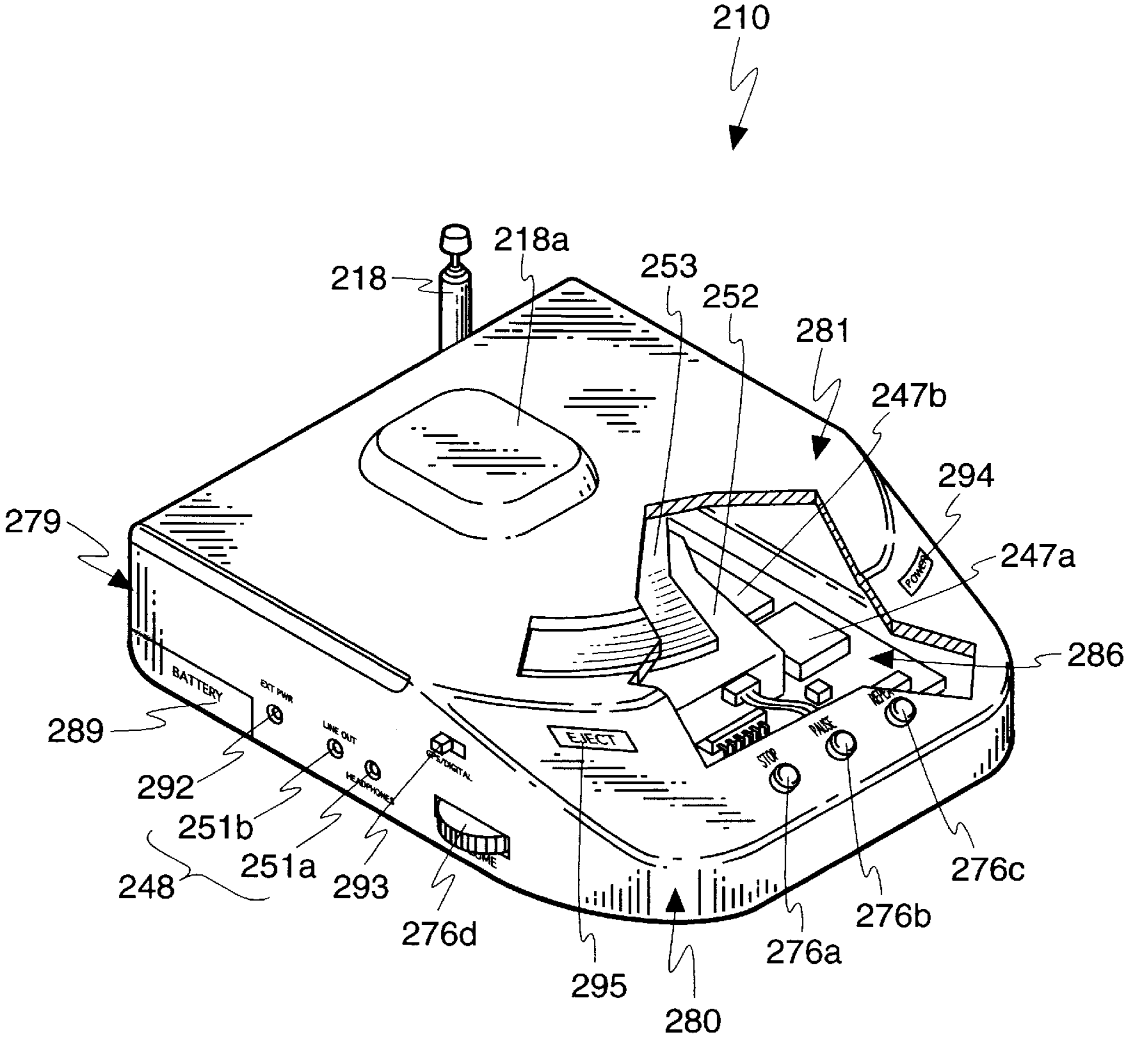
FIG. 4 is a front perspective cut-away view of one presently preferred embodiment of the present invention in a form that may be used for personal travel enhancement and for walking and museum tours.

FIG. 4 illustrates a further example of a configuration that one skilled in the art may use in implementing the present invention 10. The apparatus 210 of FIG. 4 includes a receiver 47 having both a GPS receiver 247*b* and a local broadcast receiver 247*a*. With both types of receivers included in the unit 210, a user may use forms of transportation where GPS signals can be received and may also enter into areas of restricted access to GPS satellites. The local broadcast receiver 247*a* may also be used in applications where close site proximity may cause GPS overlap location errors.

The system 210 of FIG. 4 and the system 110 of FIG. 3 may operate similarly. Some of the disparate features of the unit 210 of FIG. 4 will be pointed out. The digital antenna 218 may be located on the rear panel 279 of the case 280 and the digital receiver 247*a* may be located on the computer board 286. The GPS antenna 218*a*may be located on the lid 281 and the GPS receiver 247*b* may be located on the computer board 286. The case 280 may be made from a substantially rigid material, such as injected plastic or the like.

Data 68 may be stored on a CD-ROM 253 readable by a CD-ROM drive 252. Portions of data 68 may be transferred to a multi-function computer board 286. Current location data 56*a* may be transferred from the location identification device 46 to the computer board 286 to be compared with the predefined location data 54.

As stated, the system 210 may include a local broadcast receiver 247*a*. The local broadcast receiver 247*a* may be located on the multi-function board 286. The local broadcast receiver 247*a* may receive signals through the antenna 218. It will be appreciated by one skilled in the art that separate antennas 18 may be used for the GPS receiver 247*b* and for the local broadcast receiver 247*a*.

A user may manually switch between using the GPS receiver 247*b* and the local broadcast receiver 247*a* through a selector 293. Alternatively, functionality may be built into the location identification device 46 or the controller 50 to automatically switch from using GPS to using a local broadcast signal when a GPS signal 16 is not available. This may be done by programming the processor 58 to monitor the location identification device 46 for a signal that the GPS receiver 247*b* is not receiving GPS signals 16. The exact signal that may indicate this depends on the particular type of GPS receiver being used. Once the processor 58 receives this signal indicating that the GPS receiver 247*b* is no longer receiving GPS signals 16, the processor 58 may send a control signal to the location identification device 46 to switch the receiver 47 from using the GPS receiver 247*b* to using the local broadcast receiver 247*a*. The processor 58 may periodically switch the receiver 47 back to the GPS receiver 247*b* to determine whether GPS signals 16 are still not available or whether they are available. If GPS signals 16 are available, the processor 58 may continue using the GPS receiver 247*b*.

The GPS receiver 247*b* may follow a sequence of events typical of GPS receivers known in the art. The GPS receiver 247*b* may receive a radio frequency (RF) signal 16 from several orbiting satellites. From these signals 16, the GPS receiver 247*b* may calculate the current location of the receiver 247*b*. This current location may be stored as current location data 56*a*. The current location data 56*a* may be saved as, or converted into, a form suitable to be output from the location identification device 46 to the controller 50. The system 10 may check to see that the current location data 56*a* is a true GPS signal or random noise. If the data 56*a* is valid GPS data, it may be used and processed by the processor 58. If the data 56*a* is not valid, the processor 58 may switch to the local broadcast receiver 247*a*.

Operation of the local broadcast receiver 247*a* may be accomplished in a variety of ways. The local broadcast signal 38 may be a specified signal defined such that when the local broadcast receiver 247*a* receives the signal 38 of at least a minimum strength, the controller 50 may be able to determine whether the device 210 is within the triggering distance. Additionally, the local broadcast signal 38 may include digital data. In this form, the digital receiver 247*a* and transmitter may act very similarly to the GPS system, but will not have the same range. The local broadcast transmitter 40 may transmit a predefined digital signal over a very small area that may be used for both inside and outside use. Unlike the GPS device, this location identification device 46 may allow users to approach very closely to the predefined location to activate output of the information 44 through and/or by the presentation device 248. This type of location device helps overcome the accuracy errors seen in the GPS units. As the digital receiver 247*a* comes into close range of the transmitter 40, it may receive a low power digital signal 38. The receiver 247*a* may send a digital code to the controller 50 indicating the current location. From the current location, the controller 50 may determine which information 44 to present to the user.

Power may be supplied to the system 210 by a battery 289. Alternatively, an external power source (i.e., an electrical plug) may be used by connecting a suitable power cord (not shown) to a power connector 292.

The output signal conveying the information 44 may be used in combination with an audio type of presentation, such as, for example, headphones, speakers, or other forms of audio presentation. To be operably connected to these types of presentation systems, the presentation device 248 may comprise a headphone jack 251*a* and accompanying driving circuitry, a line out jack 251*b* and accompanying circuitry, or the like.

A user input device 76 may be used in combination with the present invention to enable a user to control the presentation of the information 44. The user input device 76 may comprise buttons, switches, or the like. Various types of buttons may be used. For example, the user input device 76 may include a stop button 276*a*, a pause button 276*b*, repeat button 276*c*, a volume control dial 276*d*, and the like. The user input device 76 may also include a power button 294 for supplying power to the unit 210 and an eject button 295 for removing the CD-ROM 253.

Figure 5:
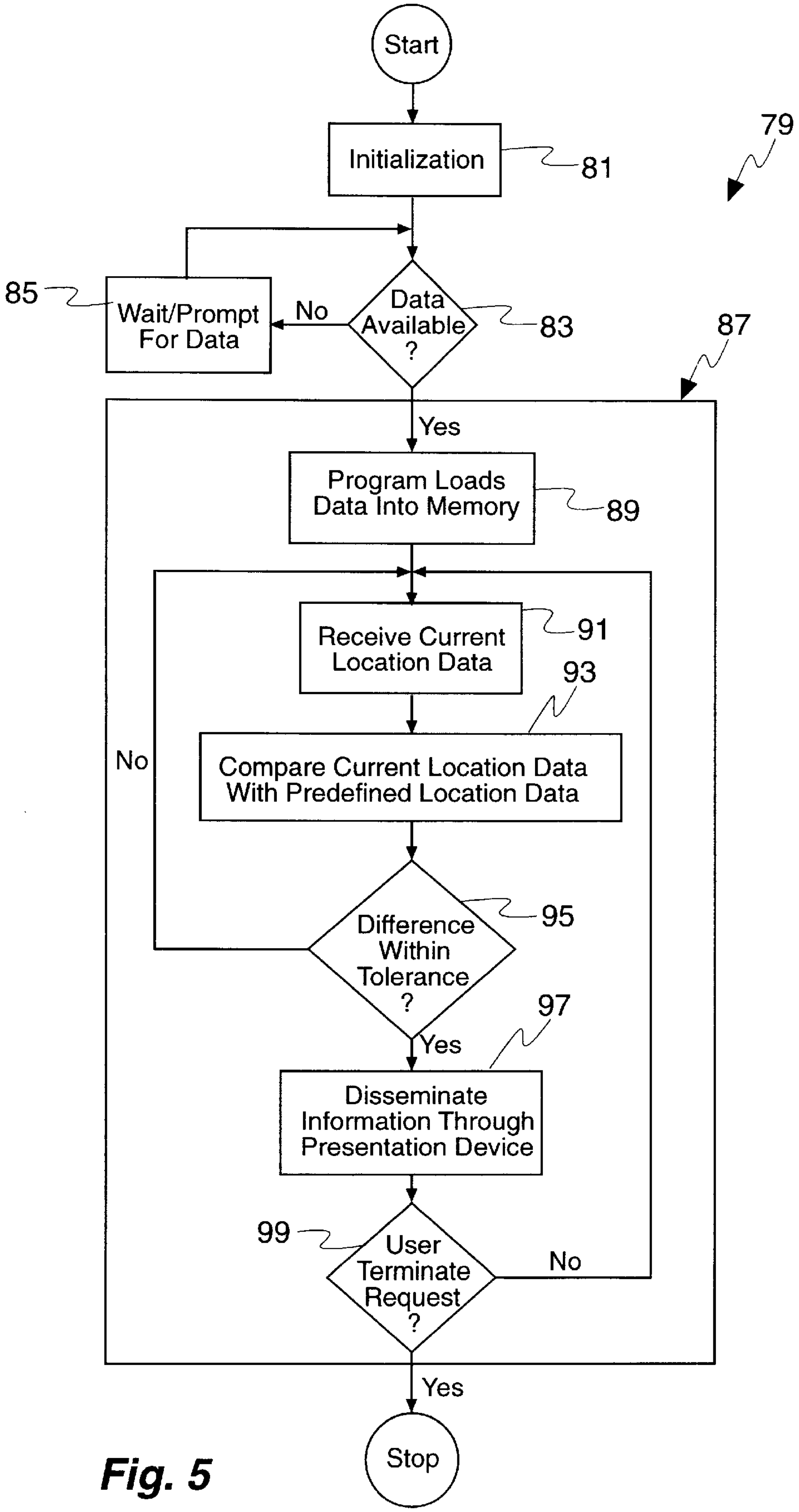
FIG. 5 is a flow diagram showing the overall process steps that occur with the present invention in disseminating location specific information to a user.

Now referring to FIG. 5, a flow diagram 79 illustrates steps that may be followed by an apparatus to implement a method 79 for disseminating information, corresponding to a location, to a user positioned proximate the location. When the apparatus 10 is first powered up it 10 may initialize 81 various pieces of data, components, devices, or the like. In one presently preferred embodiment, the initialization step 81 may include initializing the location identification device 46, the storage device 52, the presentation device 48, and the user input device 76. Initialization 81 may include ensuring that communication may be achieved between the controller 50 and the other components that may be operably connected thereto.

The system 10 may also verify 83 that the information 44 and the predefined location data 54 are available and valid. This step 83 may be done with the initialization step 81. If the necessary data is not available, the unit 10 may wait 85 for the user to insert the necessary storage medium into the storage device 52. If capable, the unit 10 may prompt 85 the user to insert the storage medium into the storage device 52 and then wait 85. The system 10 may again attempt to verify 83 that current location data 56*a* is available and valid.

After initialization 81 and verification 83 that the necessary data is available, the method 79 may execute 87 a program to carry out the necessary comparison and presentation functions. The program may first load 89 necessary data into RAM 66 including loading executables 60, drivers 73, and data 68*b* from either the ROM 64 or the storage device 52. Executables 60 including the comparison module 70 and the presentation module 72 may be copied to RAM 66. Additionally, if needed, drivers 73*b* capable of driving various peripheral devices that may be attached to the controller 50 may also be copied to RAM 66. Certain pieces of data 68 may also be copied into RAM 66 including the tolerance 74*b*, the current location data 56*b*, and the predefined location data 54*b*.

In transferring data 68, the processor 58 may begin reading the data 68 from the storage device 52, ROM 64, or the like, and placing it in RAM 66. The processor 58 may continue reading until it reaches the end of the file. Once the end of a file is reached, the processor 58 may begin copying the next file or module necessary.

The program steps 87 may then include receiving or reading 91 the current location data 56*a* from the location identification device 46. The current location data 56 may be copied into RAM 66 or it may simply be stored in an internal storage location (not shown) in the processor 58 (e.g., a register).

After the program has the current location data 56, the program may compare 93 the current location data 56 with the predefined location data 54. In one presently preferred embodiment, the predefined location data 54 may include a set of predefined location data values, where each value corresponds to a different location. Accordingly, the comparison 93 step may include iteratively comparing the current location data 56 with each predefined location data value within the predefined location data 54. The comparison 93 may be made in different dimensions including, but not limited to, distance. The comparison 93 may be based on the current velocity and a preset error band.

Once the difference is obtained, the program may then determine 95 whether the apparatus 10 is within the triggering distance by comparing the difference with the tolerance. If the apparatus 10 is within the triggering distance, then the program may proceed to automatically disseminate 97 the information to the user through the presentation device 48. The program 87 may select the appropriate segment of information 44 to disseminate by referring to the predefined location data value that was used to compare with the current location data 56. If the apparatus 10 is not within the triggering distance the program 87 may cycle to the next predefined location data value (in an embodiment where the predefined location data 54 comprises a plurality of predefined location data values corresponding to different locations), or the program 87 may read an updated current location data 56.

Once the information 44 has been disseminated 97, the program 87 may determine 99 if the user has input a request to terminate the program. In one presently preferred embodiment, the user inputs 78 may be processed when received from the user, rather than waiting until information 44 has been disseminated 97. Such a design gives a faster response to user input. One skilled in the art will appreciate that there are many ways to achieve this. For example, a separate module may be periodically called throughout execution by the processor 58 to check and process user inputs 78. Alternatively, interrupts may be used with the user inputs 78 to facilitate a rapid response. Still, the user input device 76 may be hardwired to the presentation device 48 to automatically process the user inputs 78. If a user requests that the program 87 terminate, the controller 50 may stop processing.

This device 10 may be of a compact form and may require very little user input. If the storage device 52 is a CD-ROM, the user may only need to insert the correct CD-ROM for the area of travel and set the volume to a comfortable level. If the CD-ROM is used in a vehicle application, the FM frequency of the vehicle's radio may need to be selected. If the storage device 52 is a PCMCIA card, the user may only need to turn on the power and set the volume to a comfortable level. The level of user intervention may be nominal for many types of storage devices 52 that may be connected to this device 10. Switching the present invention 10 from using one form of location identification device 46 to another may also be transparent to the user. As the new type of location identification device 46 is attached to the controller 50, the internal program may identify the type of location identification device 46 installed and automatically readjust itself to fit the new configuration.

This device 10 may also provide users with the ability of traveling to various locations, exhibits, or historical sites using the many forms of travel used today and in the future. By using the different features of the present invention 10, the traveler, sightseer, or educational group may travel and not be troubled by having to find the correct page in a travel guide or find the mileage markers that are associated with the information on a tape. As users utilize the present invention 10 while touring through a museum or exhibit, they will be able to choose the specific sites, exhibits, or museum pieces they want to learn about. As the user approaches the desired location, an embodiment of the present invention 10 may turn itself on and automatically deliver a high-quality pre-recorded message, conveying the information about the site, to the user through the presentation device 48 attached to the unit 10 regardless of the route of travel, speed, or time of arrival at the location.

The present invention 10 may also provide a safer and more interesting distribution of information that would likely be missed using other types of devices or systems of information delivery. One way this device 10 may provide a safer trip is by automatically presenting to users the information that one would normally have to look up in a travel guide or find on a tape. Other devices can cause the traveler, bus driver, tour guide, or pilot to be distracted from what should be their main safety concern of arriving at their destination safely.

This system 10 may also be less time-consuming to the user by removing the distractions of guide books and tapes, allowing the user a more pleasant trip as they view the scenery while simultaneously hearing, reading, or watching video about it. This device 10 may also be of great use to those who travel in groups by allowing everyone in the group to hear the same presentation at the same time if they so desire, and enabling those farthest from the exhibit to hear the presentation equally well as those nearby. An added feature is the ability for tourists to hear the presentations in their native language.

From the above discussion, it will be appreciated that the present invention provides novel automated touring information systems and methods that automatically disseminate various forms of information to those who travel. The present invention further relieves users of having to rely on their own knowledge to identify significant sites.

Unlike may prior art devices, the present invention allows travelers a flexible schedule in touring points of interest whereby they are not bound by preset routes and time schedules. Moreover, this added flexibility provides to a user the flexibility of touring sites of interest at an arbitrary pace and by an arbitrary route without creating information bottlenecks. Additionally, apparatus and methods in accordance with the present invention substantially free a user from inconvenient monitoring, reading, and navigating of touring devices and/or information while touring sites of interest.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus for automatically selecting and presenting, proximate a location, information corresponding to the location, the apparatus comprising:

a location identification device for providing current location data identifying to the apparatus a current location of the apparatus, wherein the location identification device is disposed to be movable by a user;

a presentation device connected to be movable with the location identification device to present the information to a user;

a controller operably connected to control the presentation device in accordance with the current location data; and a storage device connected to be movable with the location identification device to store the information and predefined location data linking the location to the information.

2. The apparatus of claim 1 wherein the controller comprises a processor programmed to receive the current location data and compare the current location data with the predefined location data.

3. The apparatus of claim 1, wherein the controller comprises a processor programmed to control output of the information from the storage device to the presentation device.

4. The apparatus of claim 1, further comprising:

a memory device storing a tolerance corresponding to a triggering distance within which the controller will activate the presentation device; and a processor operably connected to the memory device for calculating a difference between the current location data and the predefined location data and comparing the difference to the tolerance to determine when the apparatus is within the triggering distance of the location.

5. The apparatus of claim 4, wherein the processor is programmed to iterate, wherein iterating comprises receiving the current location data, calculating the difference, and comparing the difference to the tolerance.

6. The apparatus of claim 5, wherein the processor is further programmed to control output of the information from the storage device to the presentation device.

7. The apparatus of claim 1, wherein the storage device is selected from a linear electromagnetic medium, rotating electromagnetic medium, rotating laser readable medium, and a solid-state memory device.

8. The apparatus of claim 1, wherein the information is structured in a format selected from an analog audio signal, a digital audio signal, an analog video signal, a digital video signal, a multimedia signal, and a character code signal.

9. The apparatus of claim 1, wherein the presentation device is selected from an audio speaker, a visual display, and a multimedia output device.

10. The apparatus of claim 1, wherein the location identification device comprises a receiver for receiving a signal from which the current location data is calculated.

11. The apparatus of claim 10, wherein the receiver comprises a global positioning system receiver, and the signal reflects a plurality of global positioning signals broadcast from a plurality of global positioning stations.

12. The apparatus of claim 11, wherein the receiver further comprises a local broadcast signal receiver for receiving a locally broadcast signal corresponding to the location, and a selector for selectively activating the global positioning system receiver and the local broadcast signal receiver.

13. The apparatus of claim 1, wherein the location identification device is selected from an image recognition device, a motion sensor, and a bar code reader.

14. The apparatus of claim 1, further comprising a user input device operably connected to the controller for receiving user inputs to control selection of portions of the information for presentation on the presentation device.

15. The apparatus of claim 14, wherein the controller comprises a processor programmed to process the user inputs to control the presentation device.

16. A memory device containing data structures used by a controller to control presentation of information by a presentation device receiving the information from a storage device, the data structures comprising:

current location data corresponding to a current location of the presentation device;

predefined location data bound to the information from the storage device to match each packet of information from the storage device to a corresponding predefined location;

a comparison module for reading the current location data and comparing the current location data with the predefined location data; and a presentation module for controlling output of the information to the presentation device from the storage device.

17. The memory device of claim 16, wherein the data structures further comprise a driver for driving the presentation device.

18. The memory device of claim 16, wherein the data structures further comprise a tolerance corresponding to a triggering distance within which the controller will activate the presentation device.

19. A method of disseminating information, corresponding to a location, to a user positioned proximate the location, the method comprising:

providing an apparatus comprising a controller operably connected to a storage device and a presentation device, the controller comprising a processor programmed to receive inputs from a location identification device, and to control output of the information from the storage device to the presentation device, wherein the location identification device is disposed to be movable by a user, and wherein the storage and presentation devices are connected to be movable with the location identification device;

storing, in the storage device, the information and predefined location data corresponding thereto;

providing to the processor, from the location identification device, current location data corresponding to a current location;

comparing, by the processor, the current location data with the predefined location data to provide a proximity comparison reflecting whether the apparatus located at the current location is proximate the location; and controlling output of the information from the storage device to the presentation device in accordance with the proximity comparison.

20. The method of claim 19, further comprising providing, before the comparing step, a tolerance corresponding to a maximum distance from the location, within which maximum distance the proximity comparison is determined to satisfy the tolerance.

21. The method of claim 19, further comprising selecting a storage volume containing a plurality of information segments corresponding to a plurality of locations, and wherein the location and information are selected from the plurality of locations and information segments, respectively.

22. The method of claim 19, further comprising automatically selecting the information from the storage volume in accordance with a user moving toward an arbitrarily selected location of the plurality of locations.

23. The method of claim 19, wherein selecting a storage volume is selectable between manual and automatic execution thereof.

* * * * *